United States Patent [19]
Yaroshuk et al.

[11] 3,826,919
[45] July 30, 1974

[54] X-RAY TIRE INSPECTION APPARATUS

[75] Inventors: Nicholas Yaroshuk, McKeesport; Robert D. Burack, Pittsburgh, both of Pa.

[73] Assignee: Westinghouse Electric Corporation, Pittsburgh, Pa.

[22] Filed: Sept. 8, 1972

[21] Appl. No.: 287,388

[52] U.S. Cl. .................. 250/360, 250/453, 250/491
[51] Int. Cl. .......................................... G01n 23/00
[58] Field of Search .................. 73/146; 178/DIG. 5; 250/52, 53, 83.3 D

[56] References Cited
UNITED STATES PATENTS
| | | | |
|---|---|---|---|
| 3,621,246 | 11/1971 | Horsey et al. ......................... | 250/52 |
| 3,621,247 | 11/1971 | Lide ..................................... | 250/52 |

*Primary Examiner*—William F. Lindquist
*Attorney, Agent, or Firm*—D. F. Straitiff

[57] ABSTRACT

X-ray tire inspection apparatus, in which, during set-up and in an automatic mode of operation, inwardly-retracted spindles are actuated radially outward into rotating and spreading cooperation with the beads of a newly introduced tire for capture and inspection of such tire, which is thereby also simultaneously measured as to its diametral size. Conditioned by the tire-size information gained from such initial spindle operation, a control means is operable to effect automatic movement of an X-ray tube and an X-ray image pick-up means from retracted inactive positions to active tire-inspecting positions suited to the particular tire size involved.

4 Claims, 4 Drawing Figures

X-RAY TIRE INSPECTION APPARATUS

BACKGROUND OF THE INVENTION

1. Field of the Invention

The invention relates to the field of X-ray tire inspection, and more particularly to X-ray inspection of a tire while removed from any wheel on which it subsequently may be used and without transmission of X-ray through more than one tire-wall thickness at any one time.

2. Description of the Prior Art

While the field of X-ray inspection of tires prior to use is undergoing development, apparatuses currently being proposed for performing such inspection are characterized by a degree of inconvenience in set-up for inspection of tires which may vary in size from one inspection to the next.

SUMMARY OF THE INVENTION

The present invention is useful, for example, in conjunction with an X-ray tire inspection apparatus such as set forth in U.S. Pat. No. 3,621,246, issued Nov. 16, 1971 and assigned to the assignee of the present application and in which:

an X-ray beam is directed at different angles between the beads into the tire annulus toward an exterior X-ray imaging means automatically maintained aligned with such beam;

a pivotally-supported curved inspection arm capable of swinging around the exterior of the tire in the bead-to-bead direction, enables change in angulation of the X-ray source at one end of the arm to be easily obtained, as well as automatic alignment of the imaging means carried at the opposite end of the arm, while at the same time affording opportunity for the inspection arm to occupy a retracted position initially, so as to afford opportunity for the tire to be introduced to the bead-spreading and tire-rotating spindles during inspection set-up, without interference by such arm, the X-ray tube, or the imaging means mounted thereon;

suitable disposition of such spindles and construction of the supporting frame, provides an open-ended clearanceway that accommodates the swinging movement of the inspection arm and equipment thereon, thereby enabling the tire to be mounted adjacent to such frame and the complete bead-to-bead inspection of the tire without requiring a removal and sidewall reversal on the spindles;

radially adjustable spindles and pivot-position-adjustable mounting means for the inspection arm, enable different size tires to be accommodated by the apparatus;

a relatively small water-cooled X-ray tube-head as the X-ray source on the inspection arm, enables small diameter tires as well as larger diameter tires to be accommodated;

positioning of the imaging means and the X-ray tube are adjustable one relative to the other and each relative to the pivotal support location for the inspection arm, to enable a high degree of operational flexibility; and motorized means are employed for effecting position adjustments and a TV monitor is employed for viewing output from the TV camera, which enables complete inspection of the tire to be effected and controlled from a radiation-protected operator's control booth.

The present invention also is useful in conjunction with an X-ray tire inspection apparatus such as one in which the retractable X-ray tube and imaging means are mounted on separate arms, as well as one in which such tube may be adapted for insertion into the tire annulus and rotation about a local axis therein to obtain bead-to-bead directing of the X-ray beam produced by such tube.

BRIEF DESCRIPTION OF THE DRAWING

The novel and distinctive features of this invention are set forth in the claims appended to the specification. The invention itself, however, together with further features and advantages thereof may best be understood by reference to the following description and accompanying drawings, in which:

DESCRIPTION OF THE PREFERRED EMBODIMENT

Figure 1:
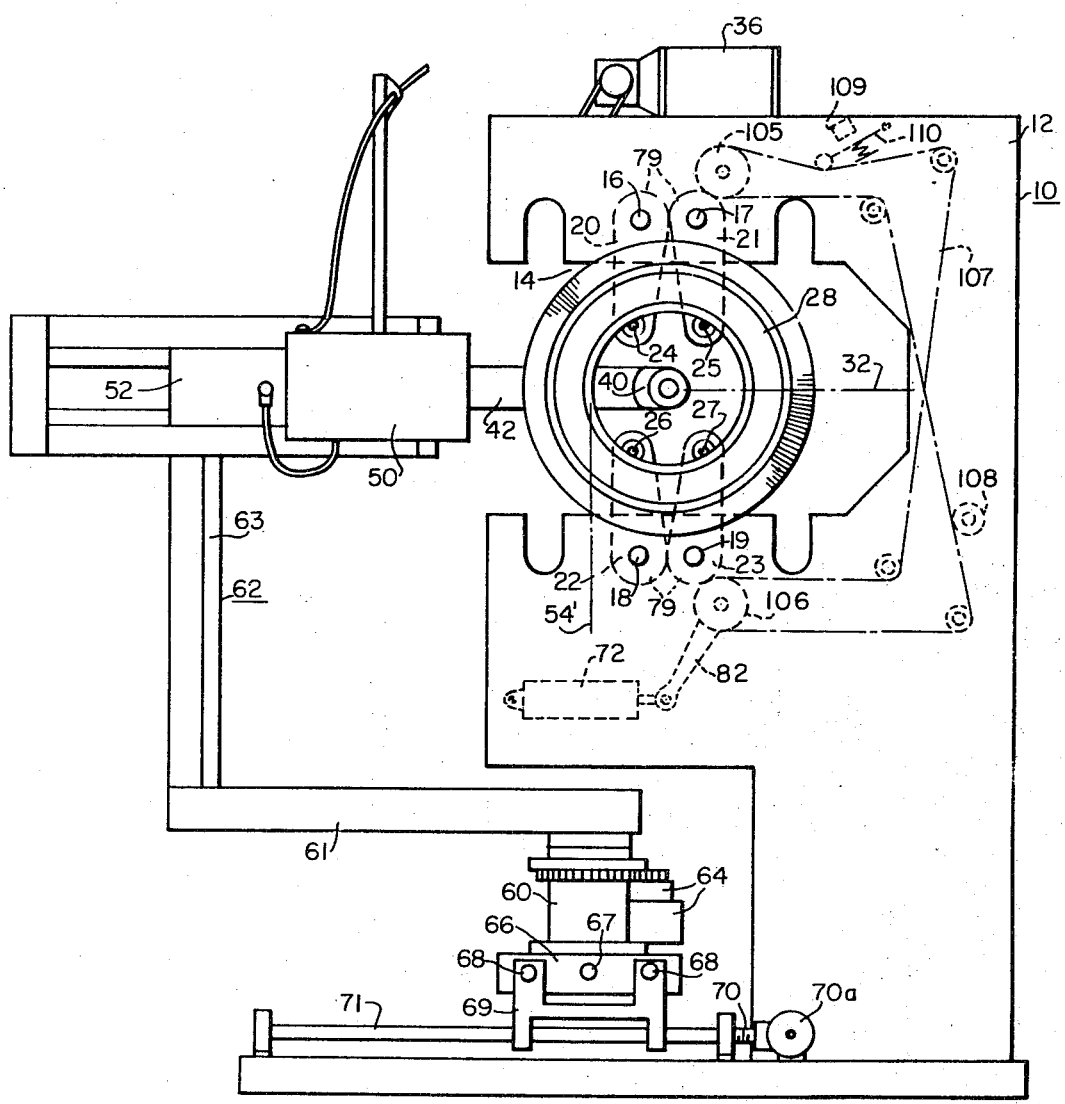
FIG. 1 is a front elevation outline view of an exemplification of an X-ray tire inspection machine embodying novel features of the present invention.
Figure 2:
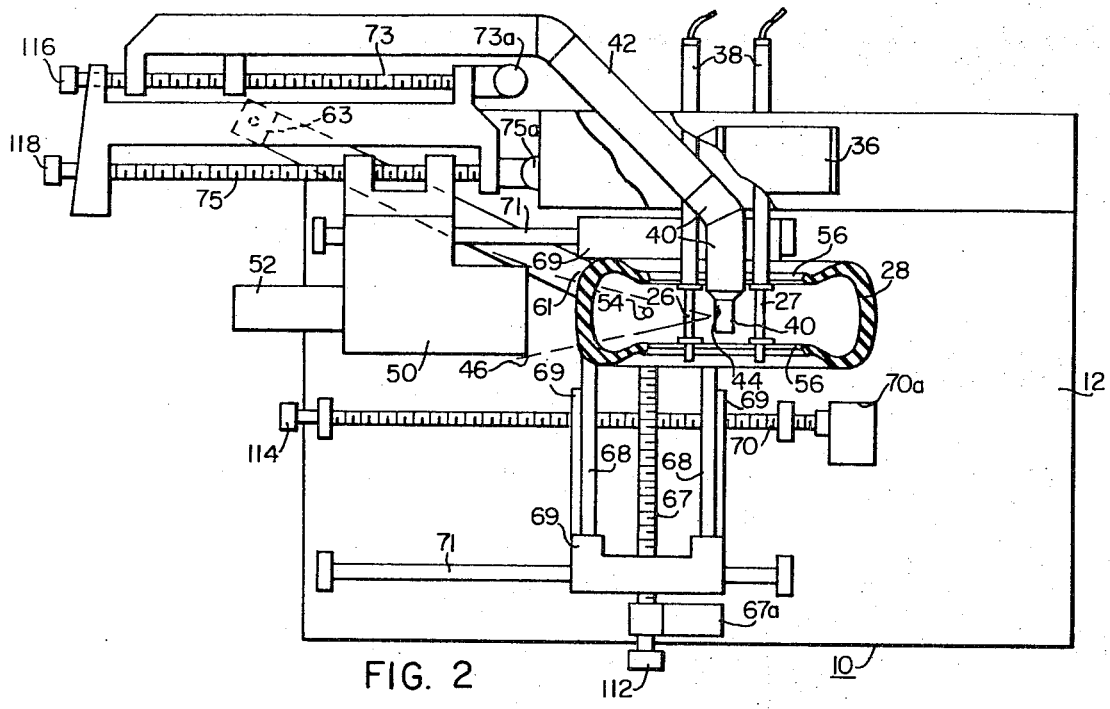
FIG. 2 is a top view, substantially in outline, of the tire inspection machine of FIG. 1.

Referring to the embodiment of FIGS. 1 and 2, the tire inspection machine 10 shown therein comprises an upright generally rectangular frame and housing assembly 12 having a horizontal open-ended slot or clearanceway 14 opening inwardly from its left side, as viewed in FIG. 1, and which extends through such frame and housing assembly from front to back. Pivotally supported at shafts 16 and 17 above clearanceway 14 and at shafts 18 and 19 below such clearanceway through the medium of arm assemblies 20, 21 and 22, 23, are two pairs of rotatable, axially-expandible spindle assemblies 24, 25 and 26, 27 for rotarily supporting and expanding the beads of a tire 28 in a vertical attitude parallel to the front of the housing 10 with the center of the tire aligned with a horizontal plane 32 located midway between top and bottom of clearanceway 14. The two top spindle assemblies 24 and 25 are rotatable by a motor 36, in a manner described in detail in U.S. Pat. No. 3,621,246, to cause the tire 28 to rotate about its center in a bead-spreaded state. Fluid pressure operated cylinders 38 at the rear of the housing 12 provide for expansion of the spindle assemblies to obtain the bead-spreading function.

Referring again to FIGS. 1 and 2, a small watercooled X-ray tube 40 is carried on one end of a horizontal curved inspection arm 42 for disposition in the tire opening with its exit window 44 aimed to project an X-ray beam 46 (FIG. 2) horizontally between the tire beads into the tire annulus and toward an input screen of an image amplifier tube 50 carried on the opposite end of the arm 42 at the exterior of the tire 28. A TV camera 52 affiliated with the output screen of such image amplifier tube is coupled to a TV monitor (not shown) at a remote location for depicting the images of the internal tire wall construction irradiated by the X-ray beam.

Referring to FIGS. 1 and 2, as the tire is being rotated on the spindles 24, 25, 26 and 27, the X-ray beam 46 will be aimed at different internal wall areas after each successive one of a number of complete revolutions until the entire wall area of the tire between the beads has been scanned by the beam for a complete X-ray examination of the tire. By movement of the X-ray tube 40 about a pivot axis 54 located substantially midway between the tire beads 56, as shown in FIGS. 1 and 2, such complete wall inspection can be effectuated without passing the beam through more than one tire wall thickness at any one time. Such movement of the X-ray tube about pivot axis 54 is effectuated by movement of the inspection arm 42 about such axis, thereby maintaining the image amplifier tube 50 and TV camera 52 aligned with the X-ray beam 46 at all angles of the X-ray tube.

To enable such pivot axis 54 to be established at a location such as between the tire beads 56 with minimal interference to mounting of the tire onto the spindles during set-up and swinging of the inspection arm 42 during use of the machine, such pivot axis is defined by a rotary joint 60, FIG. 1, at the end of a horizontal leg 61 of an L-shaped support arm 62 having the top of its upright leg 63 in supporting connection with the inspection arm 42. The inspection arm 42 and the L-shaped support arm 62 turn in unison about the rotary joint 60 which defines the pivot axis 54. For power actuation of the rotary joint 60 to obtain the aforedescribed angulation of the inspection arm 42 and enable effectuation thereof from a remote station, an inspection arm actuation motor and gear assembly 64 is provided.

Referring to FIGS. 1 and 2, to enable the pivot axis 54 to be shifted in a Y direction to suit different internal diameters of tires and in an X direction to suit different tire section widths, the rotary joint 60 is mounted on an X direction adjusting carriage 66 movable by a screw-threaded shaft 67 operated by a motor 67a along support and guide rails 68 carried on a Y direction adjusting carriage 69 which includes such shaft 67 and rails 68 and is movable by a screw-threaded shaft 70 operated by a motor 70a along support and guide rails 71.

To enable the X-ray tube 40 to be adjusted relative to the pivot axis 54, the arm 42 is suitably mounted for horizontal movement at the top of the leg 63 of L-shaped support arm 62 by such as a screw-threaded shaft 73 operated by a motor 73a, and the image amplifier tube 50 and TV camera 52 mounted thereon are similarly mounted for movement relative to pivot axis 54 by such as a screw-threaded shaft 75 operated by a motor 75a. Such position adjustments for X-ray tube 40 and image amplifier tube 50 serve to accommodate different tire sizes and operating techniques, such as a certain degree of image magnification control, for example.

The spindle arms 20 and 21 and the spindle arms 22 and 23 are coupled together for pivotal movement about their shafts 16, 17, 18, and 19 in unison via respective pairs of gears 79 affiliated with the ends of such arms. The two pairs of arms are in turn coupled for pivotal movement in unison via a gear 105 meshing with the gear 79 of arm 21, a gear 106 meshing with the gear 79 of arm 23, and a pulley-guided chain loop 107 coupling the two gears 105 and 106 together via suitable sprocket means. A fluidpressure operated cylindrical actuator 72 is operatively connected to the gear 106 via a crank arm 82 for turning the interconnected arms 20, 21, 22 and 23 to actuate the spindles 24, 25, 26 and 27 for contraction and expansion radially into and out of engagement with the beads 56 of the tire 28.

Figure 4:
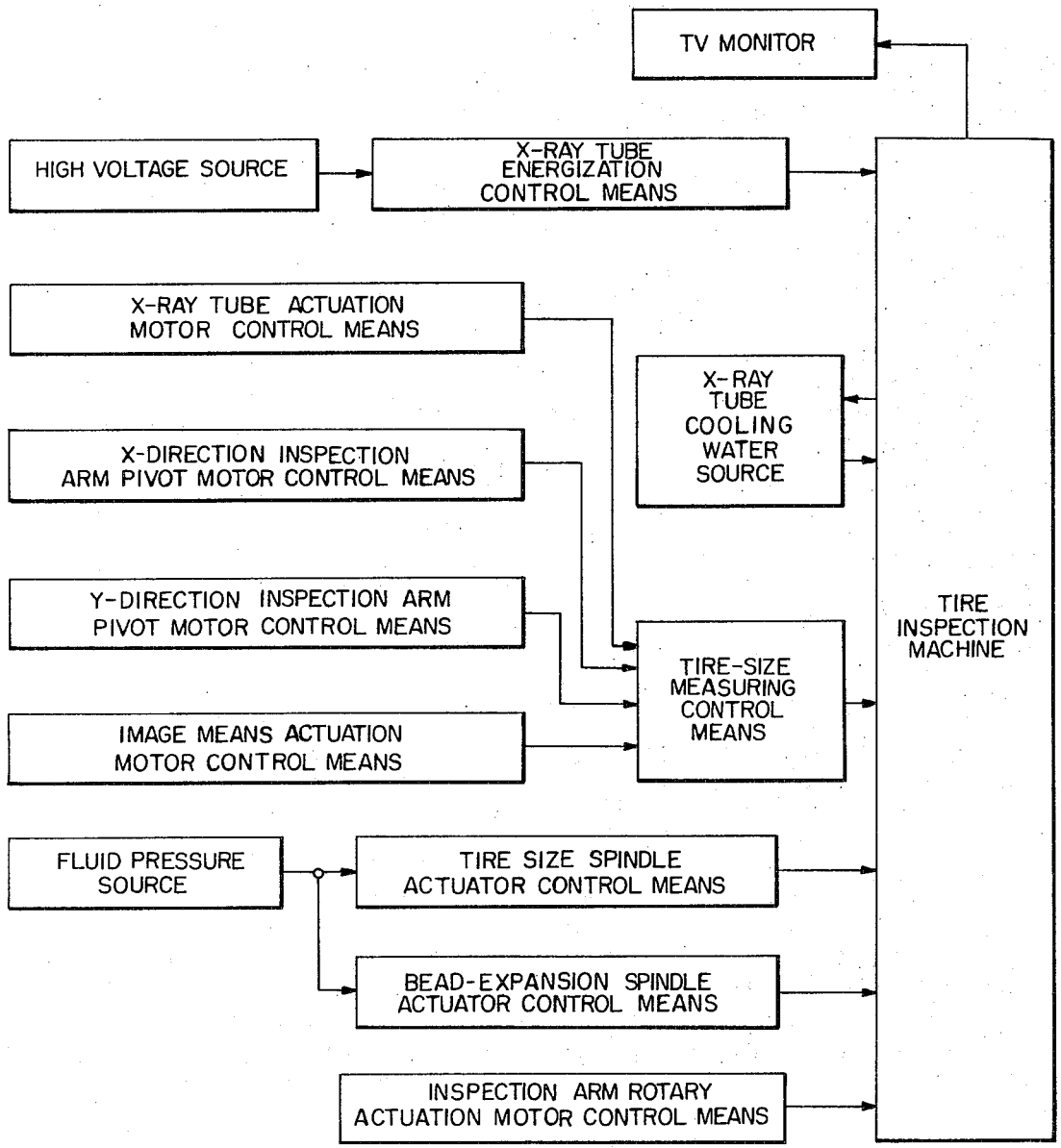
FIG. 4 is a block diagram of a complete tire inspection system embodying the invention.

In accord with the present invention, during set-up in an automatic mode of operation, the extent to which the spindles 24, 25, 26 and 27 are spread by the actuator 72 from a radially innermost park or repose position to an expanded position of constraint by the tire beads is measured by a potentiometer means 108 affiliated with the chain loop 107 and effectuated by an enable switch means 109 operated by a spring-biased idler pulley arm 110 responsive to a slack-gathering action in a portion of the chain loop 107 upon constraint of angular movement of the arms 20, 21, 22 and 23 upon engagement of the spindles 24, 25, 26 and 27 with the tire beads. Such measurement indicates the diametral size of the tire, and is introduced to a tire-size measuring control means 111 (FIG. 4) for the X and Y arm pivot adjusting motors 67a and 70a and the X-ray tube and image means adjusting motors 73a and 75a to cause the rotary joint 60 to be moved for proper positioning of the pivot axis 54 with respect to the particular sized tire, as well as the proper positioning of the X-ray tube 40 and imaging means 50 for effective inspection of such tire. Potentiometer means 112, 114, 116 and 118 affiliated with screw shafts 67, 70, 73 and 75, respectively, serve to indicate the X-Y positions of pivot axis 54 and positions of the X-ray tube 40 and imaging means 50 on the arm 42, for effecting automatic shut-off of the drive motors 67a, 70a, 73a and 75a upon establishing a null-balance relationship with the tire-size-measuring potentiometer means 108 in accord with well known motor control circuits of such type.

Figure 3:
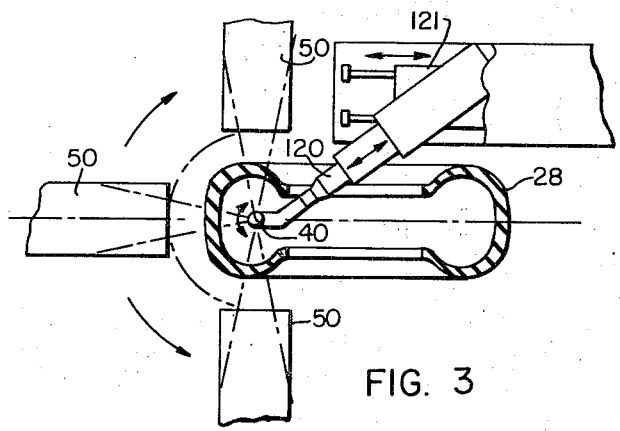
FIG. 3 is a similar view showing an alternate X-ray tube and support construction in which the invention may be embodied to advantage.

In a system such as shown in FIG. 3, the imaging means 50 may be mounted as in FIGS. 1 and 2 atop an L-shaped support arm having a rotary joint 60 etc., and the X-ray tube 40 may be rotatable about an axis through its center, as in U.S. Pat. 3,621,247 issued Nov. 16, 1971, and separately mounted on the end of a power-actuated telescoping arm 120 mounted on a power-actuated laterally-movable carriage 121.

From retracted repose positions of the X-ray tube 40 and imaging means 50, motors for positioning the imaging means support arm 62, the X-ray tube arm 120, and carriage 121 can be brought into play under null-control by corresponding position-sensing means in balance with the tire-size-reading means affiliated with the tire-rotating and bead-spreading spindles to automatically position these components for inspection appropriately with respect to the tire size.

In either type of equipment, if the bead-spreading action of the spindles is effected by equal and opposite movement from a neutral position, and/or the spread is maintained constant irrespective of tire size, then the neutral plane of the tire in which the pivot axis 54 for the image means 50 and the X-ray tube 40 should lie during inspection will remain substantially if not completely fixed for all tire sizes, so that automatic set-up movement of these components in the tire tread-width direction always results in arrival of such pivot axis in the same plane for all tire sizes accommodated by the apparatus, and such movement need not be measured but merely effectuated by use of limit switch means.

Having now described illustrative embodiments of the invention, what is claimed as new and desired to be secured by Letters Patent in the United States is:

1. Apparatus for individual X-ray inspection of tires which may be of different size from one inspection to the next, said apparatus comprising,
- support means for supporting a tire for rotation about its center during its inspection,
- measuring means for measuring size of such tire while disposed on said support means,
- X-ray tube means mounted for movement from a retracted inactive position to different active positions respectively suited for directing X-rays through the walls of different size tires when each in turn is mounted on said support means,
- X-ray pick-up means mounted for receipt of X-rays transmitted from said X-ray tube means through such tire walls, and
- means operable to effect initial movement of said X-ray tube means from its retracted inactive position to an active position appropriate to the given size tire undergoing inspection, responsively to measurement by said measuring means.

2. The apparatus of claim 1, wherein, the support means is included in the measuring means and comprises spindle means movable radially outward from an inwardly retracted attitude to a radially expanded attitude in rotary supporting engagement with the tire beads.

3. The apparatus of claim 1, wherein,
- the support means supports the tire for rotation about an axis which is the same irrespective of the size of such tire, and the aforesaid initial movement of the X-ray tube means always occurs in the same plane.

4. Apparatus for individual X-ray inspection of tires which may be of different size from one inspection to the next, comprising,
- spindle means actuable radially outward for supporting a tire at its beads for rotation about a fixed axis in coincidence with the center of such tire while holding such beads spread,
- means conditioned by radial position of said spindle means for measuring the diametral size of the tire,
- X-ray tube means mounted for movement from a retracted position outside the tire to selective different active positions in encirclement by the tire respectively suited for directing an X-ray beam outwardly through the annulus of different size tires from one bead to the other,
- X-ray image pick-up means mounted for movement from a retracted position to different active X-ray beam-aligned positions respectively suited for orbital bead-to-bead movement about the annulus of different size tires, and
- means operable to effect automatic movement of said X-ray tube means and of said X-ray image pick-up means from their retracted positions to active positions in accord with tire size, responsively to the diametral size measurement by the second named means.

* * * * *